United States Patent [19]

Brooks

[11] Patent Number: 5,349,879
[45] Date of Patent: Sep. 27, 1994

[54] HIGH-ACCURACY DISCRETE POSITIONING DEVICE

[75] Inventor: John J. Brooks, Santa Ynez, Calif.

[73] Assignee: Santa Barbara Research Center, Goleta, Calif.

[21] Appl. No.: 954,701

[22] Filed: Sep. 30, 1992

[51] Int. Cl.$^5$ .............................................. F16H 21/44
[52] U.S. Cl. .......................................... 74/96; 74/105; 74/89; 74/99 R
[58] Field of Search ............... 74/25, 49, 51, 67, 68, 74/89, 116, 99 R, 105

[56] References Cited

U.S. PATENT DOCUMENTS

| | | | |
|---|---|---|---|
| 584,130 | 6/1897 | Griswold | 74/67 |
| 4,898,042 | 2/1990 | Parsons | 74/68 |

FOREIGN PATENT DOCUMENTS

| | | | |
|---|---|---|---|
| 52-31456 | 3/1977 | Japan | 74/89 |
| 561039 | 6/1977 | U.S.S.R. | 74/68 |

OTHER PUBLICATIONS

Mechanisms & Mechanical Devices Source Book by Nicholas P. Chironis p. 30, FIG. 1 and p. 111, FIG. 8; copyright 1991.

*Primary Examiner*—Allan D. Herrmann
*Assistant Examiner*—David W. Laub
*Attorney, Agent, or Firm*—W. C. Schubert; W. K. Denson-Low

[57] ABSTRACT

An article (30) is controllably and precisely positioned at one of three discrete locations defined by a linkage. The positioning apparatus includes two independently driven cranks (34, 42), with a link (50) pivotably connected between the two cranks (34, 42). Another connector (44) is pivotably connected between one of the cranks (34 or 42) and the article (30) to be positioned. The cranks (34, 42) are rotationally adjusted so that the pivot points (52, 54) of the link (50) are collinear with the axes of rotation of the cranks (40, 48), thereby defining one of the three discrete locations. Additional cranks and links can be provided to define additional discrete locations.

18 Claims, 3 Drawing Sheets

HIGH-ACCURACY DISCRETE POSITIONING DEVICE

This invention was made with Government support under Contract No. NAS5-31350 awarded by NASA. The Government has certain rights in this invention.

BACKGROUND OF THE INVENTION

This invention relates to mechanical positioning systems, and, more particularly, to a linkage system for controllably and precisely positioning an article at discrete locations defined by the linkage.

It is often necessary to mechanically position an article at one of several precisely defined, discrete locations, and then to move the article between those locations. A variety of complex devices are available to perform such functions. A high-precision torque motor operating in conjunction with a positional encoder is one example of such a positioning device. Such devices can be extremely costly to purchase and may have limited reliability due to their complexity.

In an example of a requirement for precisely positioning an article at discrete locations, a sensor platform in an earth surveillance satellite is rotatably mounted so that its sensor may be aimed at locations along its ground track. In one version, the sensor platform must be capable of being precisely directed in one of three nominal discrete angular orientations: straight down (0 degrees reference), +20 degrees forward, or −20 degrees backward along the ground track. There is no requirement that the sensor platform be arbitrarily aimable at angles other than these nominal positions.

In one approach to meeting this requirement, a high-precision, microprocessor-controlled torque motor with an optical or electrical positional encoder feedback may be used to achieve precise positioning. The torque motor is connected to the rotatable sensor platform. The encoder measures the actual position of the sensor platform. In operation, the proper encoder position for a required angular orientation selected and commanded by the microprocessor. The encoder-based feedback system confirms that the command has resulted in the required angular orientation of the sensor platform or, if not, provides information for making the required adjustment of the torque motor.

Such a torque motor/encoder system can cost on the order of $250,000. It is complex, and therefore more prone to breakdowns and limited service life than an otherwise comparable but less complex device. The system also has the shortcoming that it provides more capability than required in some aspects, and less in others. For example, the torque motor/encoder system permits precise positioning at angular orientations other than the required three discrete positions. On the other hand, because the encoder is essentially a digital device, its increments of angular positioning at the discrete orientations is limited by the size of the digital steps and therefore may have difficulty achieving the required three discrete positions with a high degree of accuracy. Other types of precision positioning units are available, but generally also have high costs, are complex, and suffer from various shortcomings.

There is a need for an improved method and apparatus for precisely positioning an article to a discrete angular or linear location. The apparatus should be relatively inexpensive, provide long life and high reliability, and produce good controllability to the nominal location or orientation. The present invention fulfills this need, and further provides related advantages.

SUMMARY OF THE INVENTION

The present invention provides an apparatus and method for controllably and precisely positioning an article at discrete locations. In one form, the approach is used for precise angular positioning, and in another form, for precise linear positioning. The apparatus permits high levels of precision in the article position to be attained using relatively low-precision position-controlling actuators and without the need for a positional monitoring feedback system. It is therefore less costly than comparable conventional systems. The apparatus is not complex, and therefore has expected high reliability and long life.

In accordance with the invention, apparatus for controllably and precisely positioning an article at discrete locations comprises a first crank having a first axis of rotation and a first drive means for driving the first crank about the first axis of rotation, and a second crank having a second axis of rotation and a second drive means for driving the second crank about the second axis of rotation. A first link has a first end pivotably joined to the first crank at a first pivot point displaced from the first axis of rotation and a second end pivotably Joined to the second crank at a second pivot point displaced from the second axis of rotation. There is means for Joining the second crank to an article to be positioned.

Using this apparatus, an article is precisely positioned at one of three discrete nominal locations by controlling the two drive means to rotate the cranks such that the pivot points of the links on the cranks and the centers of the cranks are collinear. Since the cranks are nearly in their relative "top dead center" or "bottom dead center" locations when so adjusted, even relatively large angular adjustments produce only relatively small movements of the link extending to the article being positioned. Thus, the crank actuators can be relatively imprecise drive means and still achieve precise positioning of the article without feedback control. The positioning at the discrete locations is more nearly analog in nature than conventional positioning devices, providing greater precision in the adjustment.

These principles can be extended to the addition of more cranks and links. With each addition, more discrete locations are defined.

The approach of the invention can be used for both angular and linear positioning of the article. In each case, the first crank is supported from a fixed support. For angular positioning at discrete locations, the second crank is fixed to the article to be positioned, and the article is rotationally supported from a fixed support. For linear positioning at discrete locations, the second crank is movably supported from a fixed support and the article is movable.

The present approach provides an important advance in the art of positioning systems, where the positioning is to be at discrete, pre-defined locations. The apparatus is more precise than conventional techniques, yet also less expensive and more reliable, when used in this particular type of application. Other features and advantages of the present invention will be apparent from the following more detailed description of the preferred embodiment, taken in conjunction with the accompanying drawings, which illustrate, by way of example, the principles of the invention.

DETAILED DESCRIPTION OF THE INVENTION

The present invention is utilized to position an article at discrete locations. As that term is used herein, positioning an article at discrete locations means that a selected number of particular locations are identified, and the approach of the invention permits the article to be positioned precisely at those discrete locations. This concept of positioning is to be contrasted with the positioning of an article arbitrarily at a continuous range of locations.

Figure 1:
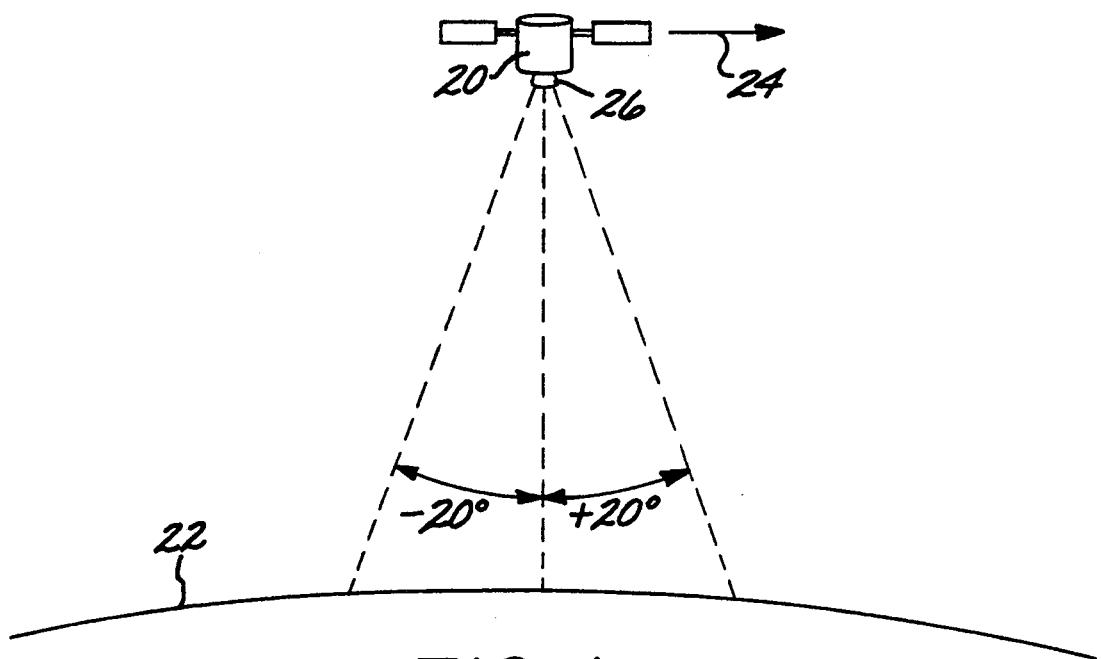
FIG. 1 is a schematic depiction of a satellite with a rotatable sensor platform.

The need to position an article at a discrete location arises in many fields, and FIG. 1 illustrates one such application. A satellite 20 orbits above the surface of the earth 22, moving in a direction marked by arrow 24. A sensor on the satellite 20 is mounted on a sensor platform 26. The system specifications require that the sensor platform 26 be capable of rotational movement so that it aims accurately in three (and only three) discrete directions: straight down (0 degrees rotation), +20 degrees rotation so that the sensor views the scene over which the satellite will subsequently pass, and −20 degrees rotation so that the sensor views the scene over which the satellite has already passed.

Existing devices for accomplishing this controlled rotation of the sensor platform are complex and expensive. A typical approach is to use a microprocessor-controlled torque motor to position the platform directly. The actual position of the platform is measured by an optical or electric digital positional encoder, and fed back so that the microprocessor may adjust the position of the platform to that required. The total range of the encoder is divided into digital increments, and the accuracy of the system is limited by the number of available measurement increments. The greater the required angular resolution and the greater the required reliability of the system, the greater the cost. Since the optical positional encoder must be very precise, the cost of the torque motor/feedback encoder system for controlling angular positioning of the sensor platform is high. The high cost also includes the capability to position the torque motor at many locations not required by the application (i.e., all locations other than the discrete locations required by the specification).

FIG. 2 depicts the approach of the invention to the positioning of an article 30 at discrete locations. This approach utilizes components that are relatively imprecise, and therefore less costly, to achieve highly precise positioning of the article. Referring to FIG. 2, the article 30 is pivotably mounted on a fixed support 32. A first crank 34 is pivotably mounted to another fixed support 36. The first crank 34 includes a disk 38 that is rotatably mounted on a first axis of rotation 40 (which extends out of the plane of the illustration FIG. 2). The first crank 34 driven to a controllable rotation by a motor, to be discussed in greater detail subsequently. A second crank 42 is pivotably mounted to the article 30 by a support rod 44 that is fixed to the article 30. The second crank 42 includes a disk 46 that is rotatably mounted on a second axis of rotation 48 (which extends out of the plane of the illustration FIG. 2). The second crank 42 driven to a controllable rotation by a motor, to be discussed in greater detail subsequently.

A link 50 extends from the first crank 34 to the second crank 42. A first end of the link 50 is pivotably joined to the first crank 34 at a first pivot point 52, which is on the first crank 34 but is displaced from the first axis of rotation 40. A second end of the link 50 is pivotably joined to the second crank 42 at a second pivot point 54.

Figure 2A:
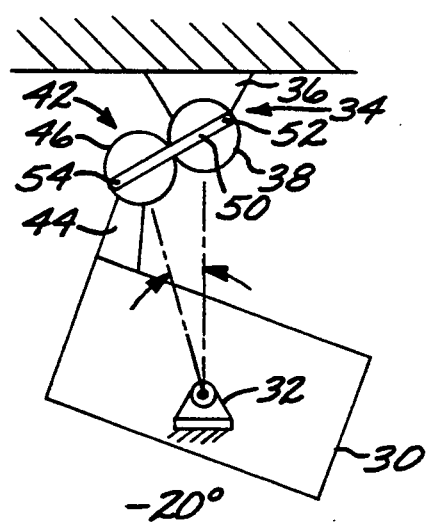
FIG. 2 is an elevational view of a positioning apparatus used for rotational positioning at discrete locations, with FIGS. 2(a), 2(b), and 2(c) showing the three discrete locations.
Figure 2B:
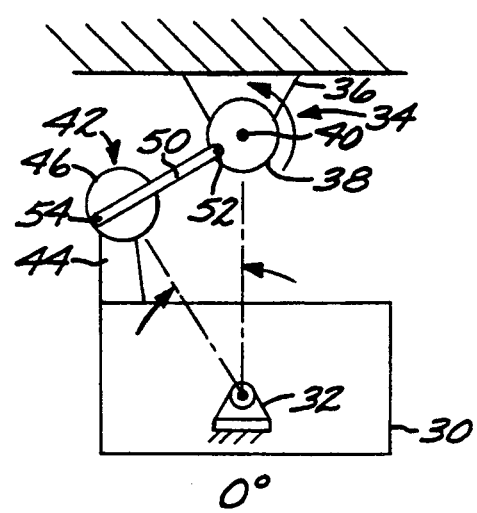
Figure 2C:
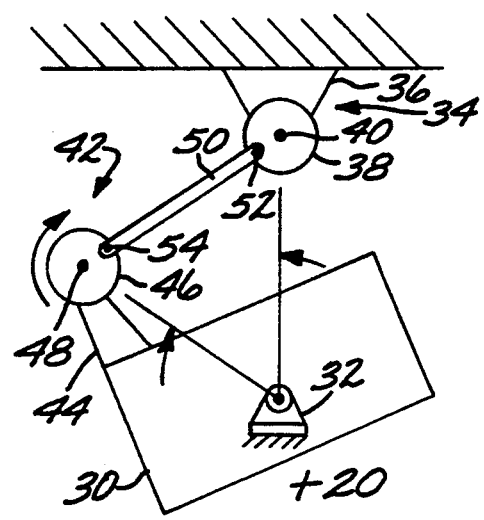

The positioning apparatus just described permits the article 30 to be mechanically rotated to three discrete angular locations by aligning the pivot points 52 and 54 collinearly with the axes of rotation 40 and 48. The rotation of the cranks 34 and 42 to three different relative orientations defines such three angular locations. In FIG. 2(a), the cranks are oriented so that the pivot points 52 and 54 are diametrically opposed across the diameters of the cranks. Since the length of the link 50 is constant, the second crank 42 is drawn toward the first crank 34, causing the article 30 to pivot about its support 32. In FIG. 2(b), the first crank 34 is rotated by 180 degrees and the second crank 42 is not rotated at all, moving the second crank 42 away from the first crank 34, thereby rotating tile article 30 about the support 32. (An identical degree of rotation could have been achieved by not rotating the first crank and rotating the second crank by 180 degrees.) In FIG. 2(c), the first crank 34 is not rotated further from the orientation of FIG. 2(b), but the second crank 42 is rotated by 180 degrees. This rotation causes the second crank 42 to be separated from the first crank 34 even further than in FIG. 2(b), and produces even further rotation of the article 30 about the support 32.

The amount of rotation of the article 30 is determined by the relative sizes of the cranks 34 and 42 and the length of the link 50.

As is apparent from the figures, the cranks could be turned less than 180 degrees, so that intermediate rotations of the article 20 can be achieved. However, positioning the cranks such that the pivot points 52 and 54 and the axes of rotation 40 and 48 are aligned produces highly desirable results. These aligned configurations define three discrete locations that can be easily determined by the orientation of the cranks. A high degree of accuracy of the angular orientation of the article 30 can be achieved even when the motors used to drive the cranks are not of high precision, and in the absence of an expensive positional encoder for positional feedback.

This relative improvement in positioning accuracy arises because, at the positions of alignment of the pivot points 52 and 54 and the axes of rotation 40 and 48, the rate of change of distance between the centers of the cranks with angular orientation of the cranks varies slowly. (The rate of change is much larger when the cranks are oriented so that the points 52, 54, 40 and 48 are far from linear alignment.) Thus, a slight misorientation in the cranks, such that the points 52, 54, 40, and 48 are not perfectly aligned, results in a very small misorientation of the article 30 from its desired discrete location. Consequently, accuracy of the rotation of the article 30 to within specified tolerances can be achieved with relatively imprecise drives (motors) that angularly orient and position the cranks 34 and 42. The reduction in the required precision of the drives decreases their cost and increases the likelihood of a long expected service life. Thus, for example, stepper motors can be used as the drives.

Figure 3:
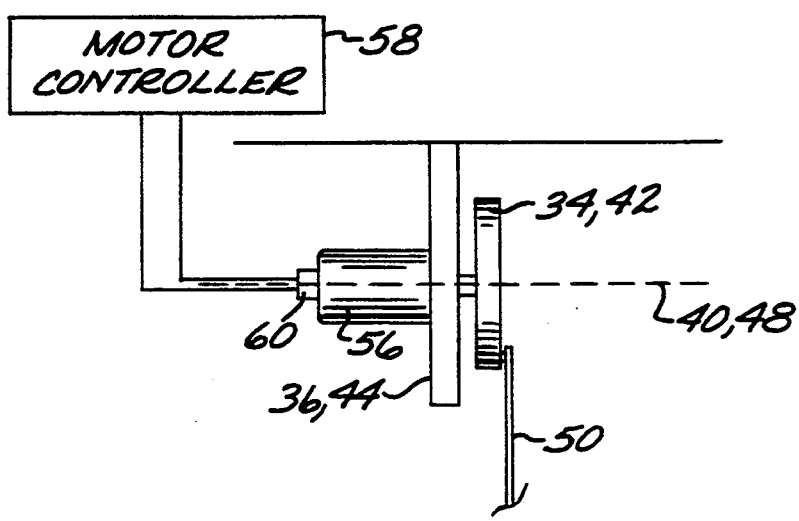
FIG. 3 is an elevational view of a crank and crank actuator.

FIG. 3 illustrates a drive arrangement for a crank 34 or 42. The crank 34 or 42 is supported on a base, which may be a fixed support 36 or a movable support rod 44, respectively. A drive motor 56 is supported on the base, preferably with its output shaft coincident with the axis of rotation of the crank. The drive motor may optionally be laterally displaced from the axis of rotation 40 or 48, and connected to the shaft of the crank through a drive train such as a gear train or a belt. The drive motor 56 is preferably a stepping motor of the conventional type, whose position is commanded by a motor controller 58. (The motor controller 58 also commands the position of the other drive motor or motors to achieve the linear positioning discussed previously.) There may be, but need not be, a sensor 60 whereby the controller 58 can sense the position of the shaft of the crank and adjust the motor 56 accordingly. The present drive motor 56 may be a much less complex stepping motor than is required in a conventional arrangement wherein a torque motor rotates the article directly. The present approach does not require an encoder for positional feedback.

FIG. 2 relates to the preferred application of the present approach in angular positioning. This approach may also be used for linear positioning, as shown for one embodiment in FIG. 4. In FIG. 4, the same reference numerals are used to refer to corresponding elements of structure as in FIG. 2. Details of the structure of those elements of structure are the same as described in relation to FIG. 2, except as will be discussed next. The article 30 is moved in a linear manner, rather than a rotational manner. In FIG. 4, the article 30 is shown as supported on a table, but it could as easily be free swinging. The first crank 34 is supported from a fixed support 36. The second crank 42 is pivotably supported by a pivoting mechanism 70 from a second fixed support 72. In the illustrated pivoting mechanism 70, a pivoting link 74 is pivotably supported at one end from the second fixed support 72 and rotatably attached at the other end to the second crank 42. The first crank 24 and the second crank 42 are connected by the link 50, and the second crank 42 is connected to the article 30 by a connecting rod 76. The connecting rod 76 is similar to the support rod 44 in function, except that it is pivotably mounted to the article 30.

Figure 4A:
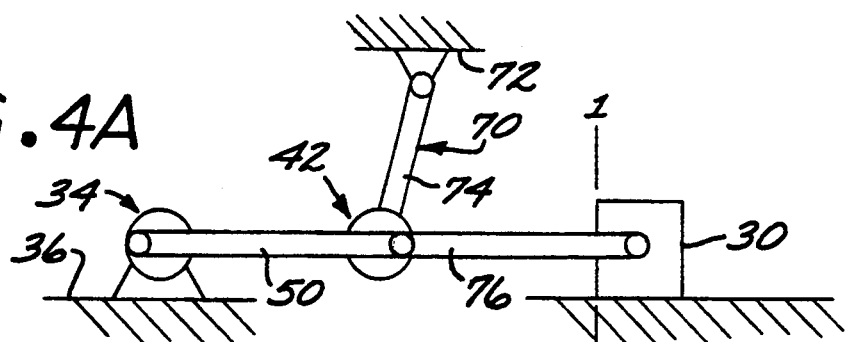
FIG. 4 is an elevational view of a positioning apparatus used for linear positioning at discrete locations, with FIGS. 4A, 4B, and 4C showing the three discrete locations.
Figure 4B:
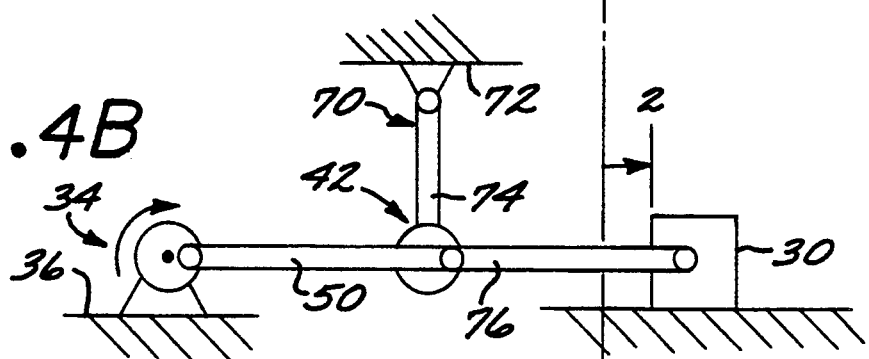
Figure 4C:
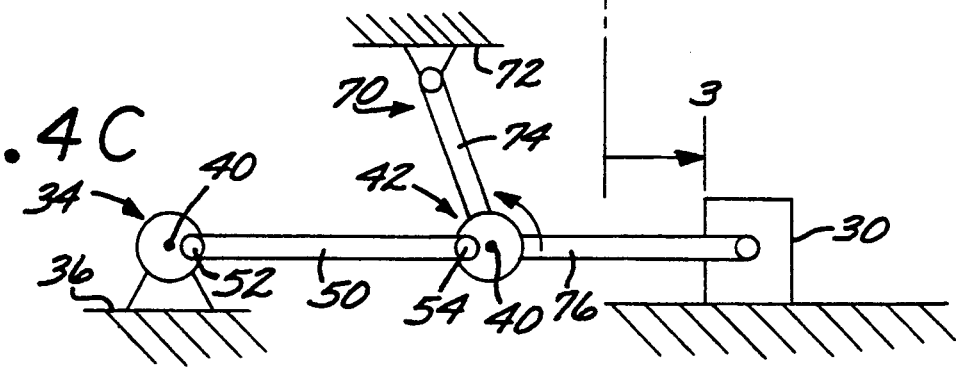

Using the same principles discussed in relation to FIG. 2, the article 30 may be moved linearly between three discrete locations, as shown in FIGS. 4A, 4B, and 4C. The article 30 may also be adjusted at these discrete locations by rotating the cranks 34 and/or 42 as discussed previously. The same principle of a small change in distance between the cranks 34 and 42 with a rotation in the cranks, when the pivot points 52 and 54 and the axes of rotation 40 and 48 are aligned or nearly aligned, is equally applicable. There may be a slight misalignment of those four points as the system moves between the states of FIGS. 4A, 4B, and 4C, as the pivoting link 74 remains of constant length. This slight misalignment is predictable and may be accounted for geometrically. In the discrete locations depleted in FIGS. 4A, 4B and 4C, the four points may in fact be aligned, although each rotation to move between the discrete locations may not be exactly 180 degrees due to the constant length of the pivoting link 74. These various states of alignment and near alignment are within the scope of the invention. Because only small linear changes are produced by relatively larger angular rotations, slight misalignments have negligible effects on the positioning achievable with the present approach and are acceptable.

Figure 5:
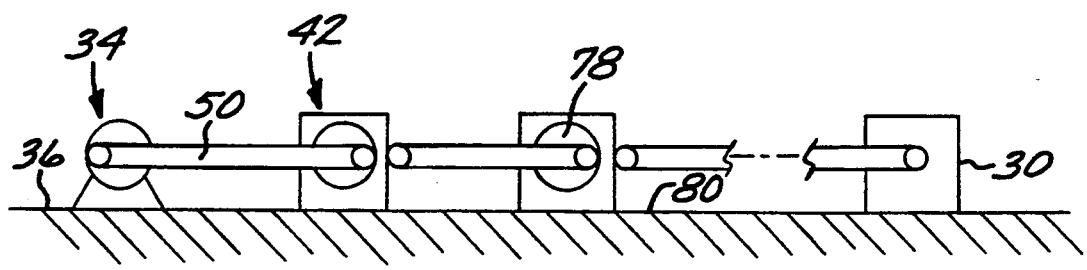
FIG. 5 is an elevational view of a multistage linear positioning device.

A variation of the linear positioning configuration is shown in FIG. 5. In this version, additional discrete positions can be defined by adding additional cranks represented by the crank 78. Thus, the cranks 34, 42 drive an additional drivable linkage to the crank 78, and to additional cranks that may be added in a linear manner. In this form, the cranks 42 and 78 are slidably supported from a fixed support 80 (which may be the same as the fixed support 36). The axes of rotation of the cranks and the pivot points of the links between the cranks are perfectly aligned when the cranks are so adjusted.

The present invention provides a relatively inexpensive approach to positioning articles at discrete locations. The positioning can be either angular or linear. The approach uses drive motors of relatively low accuracy to achieve high angular or linear accuracy of the article, resulting in lower costs for the system. Although a particular embodiment of the invention has been described in detail for purposes of illustration, various modifications may be made without departing from the spirit and scope of the invention. Accordingly, the invention is not to be limited except as by the appended claims.

What is claimed is:

1. Apparatus for controllably and precisely positioning an article at discrete locations, comprising:
   a first crank having a first axis of rotation;
   first drive means for controllably driving the first crank about the first axis of rotation;
   a second crank having a second axis of rotation;
   second drive means for controllably driving the second crank about the second axis of rotation, at least one of the first drive means and the second drive means being a stepper motor;
   a link having a first end pivotably joined to the first crank at a first pivot point displaced from the first axis of rotation and a second end pivotably joined to the second crank at a second pivot point displaced from the second axis of rotation; and
   means for joining the second crank to an article to be positioned.

2. The apparatus of claim 1, further including
   controller means for controlling the first drive means and the second drive means to rotate the first crank and the second crank, respectively, to positions such that the first pivot point and the second pivot point are collinear with the first axis of rotation and the second axis of rotation.

3. The apparatus of claim 1, wherein the article is a linkage having
   a third crank having a third axis of rotation; and
   means for driving the third crank about the third axis of rotation.

4. The apparatus of claim 1, further including a linkage having
   at least one additional crank, each additional crank having its own axis of rotation; and means for driving each additional crank about its own axis of rotation.

5. The apparatus of claim 1, wherein the first crank is supported from a fixed support.

6. The apparatus of claim 5, wherein the second crank is supported from a fixed support.

7. The apparatus of claim 1, wherein the article is rotationally supported from a fixed support.

8. The apparatus of claim 1, wherein each of the cranks is disk shaped.

9. Apparatus for controllably and precisely positioning an article at discrete locations, comprising:
- a first crank having a first axis of rotation, the first crank being supported from a first fixed support;
- first drive means for driving the first crank about the first axis of rotation;
- a second crank having a second axis of rotation;
- second drive means for driving the second crank about the second axis of rotation;
- a first link having a first end pivotably joined to the first crank at a first pivot point displaced from the first axis of rotation and a second end pivotably joined to the second crank at a second pivot point displaced from the second axis of rotation; and
- a second link having a first end pivotably joined to the second crank and a second end joined to an article to be rotationally positioned at one of three discrete angular orientations, the article to be positioned being rotationally supported from a fixed support.

10. The apparatus of claim 9, wherein the article is a sensor platform.

11. The apparatus of claim 9, further including controller means for controlling the first drive means and the second drive means to rotate the first crank and the second crank, respectively, to positions such that the first pivot point and the second pivot point are collinear with the first axis of rotation and the second axis of rotation.

12. The apparatus of claim 9, wherein at least one of the first drive means and the second drive means is a stepper motor.

13. Apparatus for controllably and precisely positioning an article at discrete locations, comprising:
- a first crank having a first axis of rotation, the first crank being supported from a first fixed support;
- first drive means for driving the first crank about the first axis of rotation;
- a second crank having a second axis of rotation;
- a first link pivotably supported at one end to a second fixed support and rotatably attached at the other end to the second crank;
- second drive means for driving the second crank about the second axis of rotation;
- a second link having a first end pivotably joined to the first crank at the first pivot point displaced from the first axis of rotation and a second end pivotably joined to the second crank at a second pivot point displaced from the second axis rotation; and
- a third link having a first end pivotably joined to the second crank and a second end pivotably joined to an article to be linearly positioned at one of three discrete linear positions.

14. The apparatus of claim 13, further including controller means for controlling the first drive means and the second drive means to rotate the first crank and the second crank, respectively, to positions such that the first pivot point and the second pivot point are collinear with the first axis of rotation and the second axis of rotation.

15. The apparatus of claim 13, wherein at least one of the first drive means and the second drive means is a stepper motor.

16. A method for controllably and precisely positioning an article at discrete locations, comprising the steps of:
- rotationally supporting an article to be positioned from a fixed support;
- providing an apparatus comprising
  - a first crank having a first axis of rotation through a center of the first crank,
  - first drive means for driving the first crank about the first axis of rotation,
  - a second crank having a second axis of rotation through a center of the second crank,
  - second drive means for driving the second crank about the second axis of rotation,
  - a first link having a first end pivotably joined to the first crank at a first pivot point displaced from the first axis of rotation and second end pivotably joined to the second crank at a second pivot point displaced from the second axis of rotation, and
  - means for joining the second crank to said article; and
- adjusting the position of the first crank and the second crank so that the first pivot point and the second pivot point are collinear with the center of the first crank and the center of the second crank, thereby precisely positioning the article at one of the three discrete locations.

17. The method of claim 16, wherein the first crank is supported from a fixed support.

18. Apparatus for controllably and precisely positioning an article at discrete locations, comprising:
- a first crank having a first axis of rotation, the first crank being supported from a first fixed support;
- first drive means for driving the first crank about the first axis of rotation;
- a second crank having a second axis of rotation, the second crank being slidably supported along a second fixed support;
- second drive means for driving the second crank about the second axis of rotation;
- a first link having a first end pivotably joined to the first crank at a first pivot point displaced from the first axis of rotation and a second end pivotably joined to the second crank at a second pivot point displaced from the second axis of rotation;
- a second link having a first end pivotably joined to the second crank and a second end pivotably joined to an article to be linearly positioned at one of three discrete linear positions; and
- controller means for controlling the first drive means and the second drive means to rotate the first crank and the second crank, respectively, to positions such that the first pivot point and the second pivot point are collinear with the first axis of rotation and the second axis of rotation.

* * * * *